Sept. 8, 1964
J. VISCARDI
3,147,790
ANTI-SKID TIRE CONSTRUCTION
Filed Aug. 6, 1963
FIG. 1.
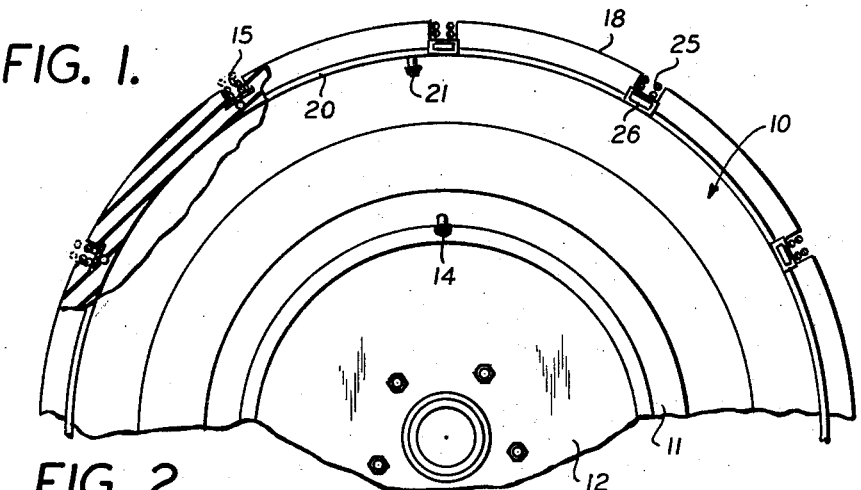
FIG. 2.
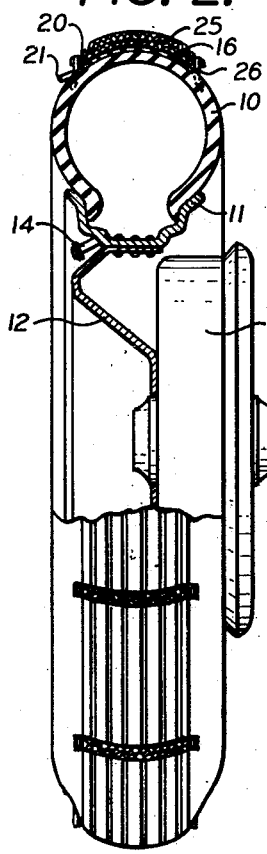
FIG. 3.
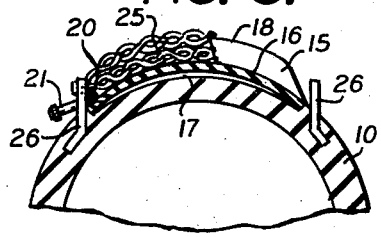
FIG. 4.
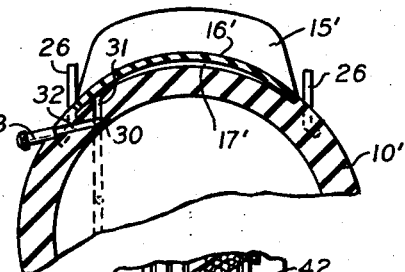
FIG. 5.
FIG. 6.
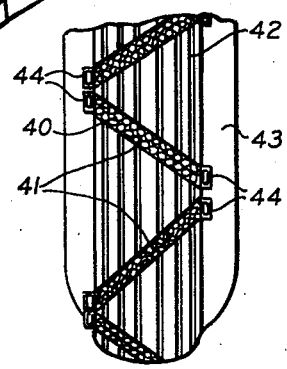
INVENTOR
JOHN VISCARDI
BY
ATTORNEYS.

United States Patent Office 3,147,790
Patented Sept. 8, 1964

3,147,790
ANTI-SKID TIRE CONSTRUCTION
John Viscardi, Lodi, N.J., assignor to Velourit Corporation, Hoboken, N.J., a corporation of New Jersey
Filed Aug. 6, 1963, Ser. No. 300,332
3 Claims. (Cl. 152—208)

This invention relates to tires for automotive vehicles and, more particularly, to a novel tire of this type provided with selectively retractable and projectable anti-skid means whereby the tire may be readily and easily adapted for traction on dry pavements or for traction when driving through snow or on ice.

Various means have been proposed and used to increase the traction of automotive vehicle tires when the vehicle is being driven through snow or over ice. The most effective means of this type has been the ordinary tire chain. Such a chain may be wrapped completely around the tire circumferentially or a plurality of individual chains may be secured at spaced zones around the periphery of the tire. However, the difficulty of applying and removing chains, as well as the fact that, under modern driving conditions, a vehicle may be driven, during a single trip, over both dry surfaces and icy or snow-covered surfaces, with the dry surfaces resulting in rapid wear of the chains, has mitigated against the use of chains.

While other means have been used to obtain traction in snow and over ice, they have not been as effective as chains. A well known example of such another means is the so-called "snow tire" which is provided with special tread formations and intended for use in driving in relatively deep snow. While snow tires are effective to an extent for driving through snow, they are not much more effective than an ordinary new tire when driving over ice, and chains remain essentially the only anti-skid arrangement which is effective to any extent in driving on ice.

In view of the known disadvantages of driving with chains, particularly where a trip may be made partly over slippery pavements and partly over dry pavements, and in view of the known difficulties in applying chains to tires and removing chains from the tires, various arrangements have been proposed whereby a chain may be more or less permanently associated with the tire but kept in a retracted position for driving over dry pavement and then extended when necessary for driving over snow or ice. The arrangements used hitherto, however, have been characterized by relatively high expense and relatively great complexity of parts, which has mitigated against their general adoption.

The present invention is directed to a novel chain equipped anti-skid tire in which the chain is normally retracted within grooves in the tire surface but may be projected to extend beyond the tire surface at will and using relatively simple means. More particularly, air chambers are provided within the tire casing and underlying the bottom surface of each groove in which a chain is positioned, this air chamber having a relatively thin and flexible outer wall in contact with the chain. The chain is anchored in position by suitable means and, when the air chamber is collapsed or empty, the chain lies within the groove with its outer surface not beyond the outer surface of the tire.

To project the chains for increased traction, an air passage is provided in the tire and interconnects all of the air chambers underlying the bottoms of the grooves having the tire chains therein, and this air passage is provided with a suitable means whereby, when desired, air may be pumped into the air passage, and from the air passage into each of the air chambers, to inflate the air chambers and thus project the associated chains outwardly of the outer surface of the tire. To retract the chains, it is merely necessary to withdraw the air or evacuate the air chambers, and the chains will then lie within the grooves and in a retracted position.

The air passage interconnecting the several air chambers may be formed to run within the tire casing and circumferentially thereof, or it may lie along a side wall of the tire if desired. Preferably the grooves holding or containing the chains extend transversely of the tire tread at spaced intervals peripherally thereof. However, the chains may be disposed in grooves running peripherally of the tire, or in grooves formed in zig-zag fashion around the periphery of the tire, or in any combination of such grooves.

For an understanding of the principles of the invention, reference is made to the following description of typical embodiments thereof as illustrated in the accompanying drawings. In the drawings:

FIG. 1 is a partial side elevation view, partly broken away and in section, of a chain equipped tire embodying the invention;

FIG. 2 is a front elevation view, partly broken away and in section, of the tire shown in FIG. 1;

FIG. 3 is a sectional view, to an enlarged scale, illustrating a groove and a chain in the groove, and projectable from the groove by inflation of an air chamber;

FIG. 4 illustrates an arrangement which is an alternative to that shown in FIG. 3, the chain being omitted to clarify the illustration;

FIG. 5 is a partial front elevational view of a modified form of tire in which the chains lie in grooves extending peripherally of the tire; and FIG. 6 is a partial front elevational view of a tire illustrating an alternative disposition of chain-receiving grooves extending transversely of a tire tread.

Referring to the drawings, a tire 10 embodying the invention is illustrated, by way of example, as a tubeless tire mounted upon the rim 11 of an automotive vehicle wheel 12 having secured thereto a brake drum 13. A suitable valve 14 is provided to inflate tire 10.

In the embodiment of the invention shown in FIGS. 1, 2 and 3, the tread of tire 10 is provided with relatively deep transverse grooves 15 which are preferably equally spaced about the periphery of the tire. The bottom or base wall 16 of each groove 15 forms the relatively thin outer wall of an air chamber 17 extending substantially the full length of each groove 15 and likewise substantially the full width thereof. The air chambers 17 are supplied with air by a tube 20 extending completely around the tire and lying adjacent the outer edge of the tread portion thereof. Tube 20 is in communication with each of the air chambers 17, and is provided with a valve 21 by means of which air may be pumped into tube 20 and thus into air chambers 17. A tire chain 25 is placed in each groove 15 to extend throughout the length thereof, each chain 25 being held in position by securing it to anchoring members 26 which are anchored in the side walls of tire 10.

FIG. 2 illustrates the tire with the chain 25 retracted. In this case, valve 21 has been opened to let the air escape from chamber 17 and tube 20. Thus, the outer wall 16 of each air chamber 17 is collapsed against the inner wall thereof. To make chains 25 effective, air is supplied to tube 20 and, from tube 20, to each of the chambers 17. This inflates the chambers, as illustrated in FIG. 3, so that wall 16 of each chamber moves outwardly pushing chain 25 outwardly so that it projects beyond the outer surface 18 of the tire tread. Chains 25 are thus effective as gripping or anti-skid means to greatly increase the traction of tire 10 when driving through snow or over ice. Should the vehicle, during the course of its travel, come to a section of bare pavement, it is merely necessary to open valve 21 to deflate chambers 17, whereupon chains 25 move back into grooves 15 to an extent such that they do not project beyond tread surface 18 of the tire.

The embodiment of the tire shown in FIG. 4 differs from that shown in FIGS. 1, 2 and 3 only in that the supply line for the chambers 17' is formed as a bore or passage running circumferentially of the tire 10' within the casing of the tire. Passages 31 connect passage 30 to each of the chambers 17' having outer walls 16' forming the bases of the grooves 15'. A passage 32 extends laterally from one portion of passage 30 and receives a valve 33 by means of which air may be supplied to passage 30 and thus to chambers 17' inflate these chambers and move the chains, which are in grooves 15', outwardly thereof so that they will grip a slippery surface. The arrangement of FIG. 4 operates in the same manner as does that of FIGS. 1, 2 and 3.

As stated, the chains need not necessarily run transversely of the tire, but may run longitudinally thereof. In FIG. 5, chains 35 are disposed within grooves formed in the tread 36 of a tire 37 mounted on a wheel 38. The grooves receiving chains 25 extend circumferentially of tire 37, and air chambers are formed beneath the entire extent of each of the grooves so that the air chambers may be suitably inflated, as by the means shown in either FIGS. 3 or 4, to project chains 25 so that they extend beyond the tread surface 36. Upon deflation of the air chambers, the chains move back into the grooves or are retracted so that they no longer extend beyond tread surface 36.

FIG. 6 illustrates an alternative embodiment of the invention in which chains 40 lie in grooves 41 which extend transversely of the tread 42 of a tire 43 but, in the arrangement shown in FIG. 6, the grooves 41 extend obliquely or diagonally across the tread 42, with adjacent grooves extending at opposite angles so as to form a sort of zig-zag pattern in the tire tread. In this case, chains 40 are anchored in position by securement to anchors 44 corresponding to anchors 26 of FIGS. 1 through 4.

The invention provides an anti-skid tire, having chain means, in which a very simple means is provided for projecting and retracting the chains. Thus, the provision of air chambers 17, 17' supplied with air from supply tubes 20 or 30, provides a simple, inexpensive and effective means for selectively projecting the chains beyond the tread of the tire. No complicated mechanical means, such as links, gearing and the like, is necessary, so that there is literally nothing to get out of order, as would be the case where mechanical means were used to project or retract the chains.

It should further be noted that the degree of projection of the chains can be controlled by the amount of inflation of the air chambers. Thus, with the chambers inflated only partially, so that the chains will project only slightly beyond the tread surface, they will provide an anti-skid action when driving in snow. If the vehicle then moves on to dry pavement, the pressure against the chains will push the same back into the grooves, compressing the air chambers slightly so that the wear on the chains in such event is greatly minimized.

The term "tire chain" as used in the foregoing specification is to be understood as meaning either a metal tire chain or a rubber or plastic tire chain. Also, the term "anti-skid means" as used in the specification and the appended claims shall be understood to comprehend any type of anti-skid device, such as chains, metal bars, pointed grippers, wood blocks, etc.

While specific embodiments of the invention have been shown and described in detail to illustrate the application of the principles of the invention, it will be understood that the invention may be embodied otherwise without departing from such principles.

What is claimed is:

1. An anti-skid pneumatic tire comprising, in combination, a tubular tire casing having opposed exterior side surfaces and between said exterior side surfaces a peripheral surface provided with a raised tread itself having opposed side surfaces located inwardly of the opposed exterior side surfaces of said tire casing, said tread being formed with a plurality of transverse grooves extending across said tread and distributed about said tire casing and said tire casing having embedded therein at the ends of said grooves a plurality of anchor members also spaced inwardly of the opposed exterior side surfaces of said tire casing and extending in the same general direction as the side surfaces of said tread outwardly away from said tire casing, said casing being formed beneath said grooves with a plurality of air chambers which are substantially co-extensive with said grooves, respectively, a plurality of separate elongated chain members respectively situated in said grooves and anchored to said anchor members so as to be retained thereby in said grooves, said chain members being situated entirely within said grooves when said chambers are deflated and projecting beyond said tread when said chambers are inflated, and an endless supply tube located next to one of said side surfaces of said tread inwardly of the adjacent exterior side surface of said casing and communicating with said chambers so that air may be supplied to and from said chambers through said tube.

2. A tire as recited in claim 1 and wherein said grooves respectively extend in directions which are substantially perpendicular to the side surfaces of said tread.

3. A tire as recited in claim 1 and wherein said grooves form a zig-zag pattern in said tread.

References Cited in the file of this patent

UNITED STATES PATENTS

| | | |
|---|---|---|
| 1,014,357 | Adam | Jan. 9, 1912 |
| 1,293,528 | Palmer | Feb. 4, 1919 |
| 2,480,548 | Carhart | Aug. 30, 1949 |
| 2,672,908 | Donegan | Mar. 23, 1954 |
| 2,708,470 | Gramelspacher | May 17, 1955 |
| 2,934,125 | Erving | Apr. 26, 1960 |
| 3,043,356 | Mayhercy | July 10, 1962 |